(12) United States Patent
Klingelhöfer

(10) Patent No.: US 8,436,290 B2
(45) Date of Patent: May 7, 2013

(54) OPTOELECTRONIC SENSOR HAVING AN EVALUATION UNIT FOR DETERMINING THRESHOLD LEVELS BASED ON INTENSITY DISTRIBUTION MEASUREMENT

(75) Inventor: Christian Klingelhöfer, Freiburg (DE)

(73) Assignee: Sick AG, Waldkirch (DE)

( * ) Notice: Subject to any disclaimer, the term of this patent is extended or adjusted under 35 U.S.C. 154(b) by 336 days.

(21) Appl. No.: 13/033,107

(22) Filed: Feb. 23, 2011

(65) Prior Publication Data

US 2011/0204211 A1 Aug. 25, 2011

(30) Foreign Application Priority Data

Feb. 25, 2010 (EP) ..................................... 10154692

(51) Int. Cl.
*H01J 40/14* (2006.01)
(52) U.S. Cl.
USPC ....................................... 250/221; 250/214 R
(58) Field of Classification Search .................. 250/221, 250/214 R, 222.1, 223 R; 340/541, 545.3, 340/555–557
See application file for complete search history.

(56) References Cited

U.S. PATENT DOCUMENTS 5,461,227 A * 10/1995 Blau ............................. 250/221
7,508,512 B1   3/2009 Rollins et al.

FOREIGN PATENT DOCUMENTS

DE    199 14 114 A1   10/1999
EP    1 233 283 A2    8/2002

OTHER PUBLICATIONS

European Search Report, dated Jul. 29, 2010 for counterpart Application No. 10154692.7, four (4) pages.

* cited by examiner

*Primary Examiner* — Que T Le
(74) *Attorney, Agent, or Firm* — Nath, Goldberg & Meyer; Jerald L. Meyer; Scott C. Langford

(57) ABSTRACT

An optoelectronic sensor (10), in particular a light barrier having a light transmitter (14) for the transmission of a light beam (18) and a light receiver (26) arranged facing the light transmitter (14) at an alignment angle to transform the received light beam (18) into an electrical received signal is provided, wherein the transmission power of the light transmitter (14) and/or the reception sensitivity of the light receiver (26) is/are set, such that the received signal has an intensity distribution varying in accordance with the alignment angle and wherein an evaluation unit (28) of the sensor (10) is configured to determine by means of the received signal whether the light beam (18) is interrupted or not. In this respect the intensity distribution is stored in a memory (28*a*) of the sensor (10) and in that the evaluation unit (28) is configured to determine, with reference to the measured intensity of the received signal from a measured intensity distribution, a lower threshold (38) and an upper threshold (40) whose separation corresponds to an accepted angular range.

15 Claims, 4 Drawing Sheets

Figure 1:
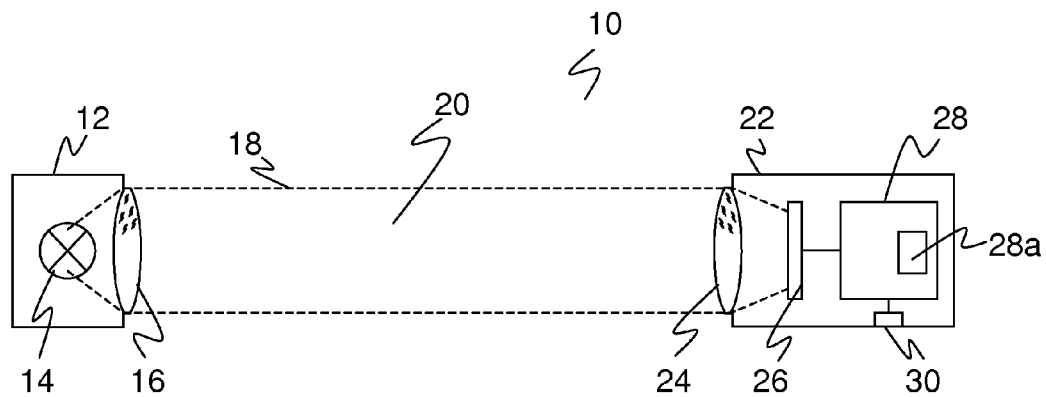

OPTOELECTRONIC SENSOR HAVING AN EVALUATION UNIT FOR DETERMINING THRESHOLD LEVELS BASED ON INTENSITY DISTRIBUTION MEASUREMENT

The invention relates to an optoelectronic sensor in accordance with the preamble of claim 1, as well as to a method for the manufacture and mounting of such a sensor in accordance with the preamble of claim 11.

Light barriers operate on the principle of transmitting a light beam, and to register and to evaluate in a light receiver, whether the received signal exceeds a switching threshold or not. Light barriers are known which have a transmitter and a receiver lying opposite of the transmitter as a one path light barrier between which the monitoring zone is spanned, or which align the transmitter and receiver onto a reflector as reflection light barriers, so that a double light path occurs. In a light grid a plurality of these single beam sensors are effectively arranged parallel to one another, wherein the natural parts of the switching electronics can then be commonly used by a plurality of beams.

An important field of application for such optoelectronic sensors is the field of safety technology. In this respect the access to a source of danger, for example a dangerous machine, is monitored by the sensor which generates a switch-off command on an unallowed entry into the protective field spanned by the beams or deflects the danger in a different manner, for example by conveying the machine into a safe park position. As the health and life of people depends on the functionality of the sensors the requirements on the sensors used in the safety technology are very stringent and normed, for example in EN 13849 for machine safety or the apparatus norm EN61496 for safety devices acting in a contact-free manner.

Because of these safety requirements faulty switchings of the sensor have to be avoided. A known source of faulty switchings are the so-called bypassed light which is explained with reference to the example shown in FIG. 5 which only shows a partial section of a light grid 100 having a transmitting strip 102 and a receiving strip 104. In the undisturbed operation the direct light beam 106 is respectively registered in the receiving strip 104. A reflecting object 108 opens in FIG. 5a an additional, indirect light path for a bypassed light beam 110. If the protective field is now infringed in that, as is illustrated in FIG. 5b, an object 112 interrupts the direct transmitting light beam 106, then this will not be recognized in the receiving strip 104, as there the bypassed light beam 110 is still being detected.

To avoid bypassed light typically the transmission angle of the light transmitter and the receiving angle of the light receiver are limited to an acceptance angle and indeed in dependence on the respective norm requirements to up to only ±2.5°. FIG. 5c explains the bypassed light situation with these acceptance angles. The reflecting object 108 lies outside of a light transmitting cone 114 defined by the acceptance angle and are not illuminated in the first place. At the same time light reflected from the object 108 would not be detected, as bypassed light is incident from a receiving light cone 116 which also defines an acceptance angle. For this reason the indirect light path 110 can not result and the interruption of the direct light path 106 is recognized by the sensor 100. Bypassed light is now only plausible in a very small spatial region in which the transmitting light cone 114 and the receiving light cone 116 intersect. The norms also require as an additional organizational measure that no reflecting surfaces are to be present in the proximity of the protective field and thus, in particular within this small spatial region.

Figure 6:
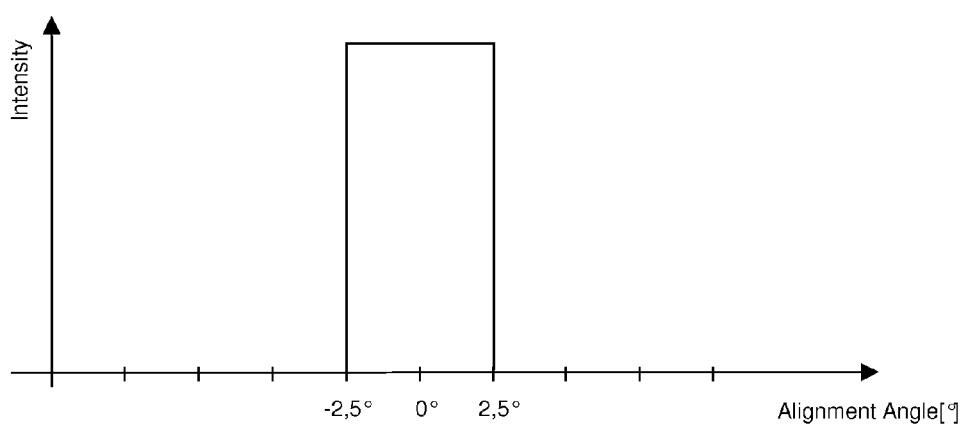

By means of the angular limitation of the transmitting light and the receiving light, the light transmitter and the light receiver have to be aligned very accurately and thus in an elaborate and costly manner. To reliably maintain small acceptance angles over the large dynamic region of the light signal which arises due to the quadratic dependency between the light intensity and separation distance between the light transmitter and the light receiver, optics with very clear focuses and exactly defined apertures are used. This leads, as shown in FIG. 6, to a very small and steep intensity distribution in dependence on the alignment angle in which relationship the light transmitter and the light transceiver are. The light signal for alignment angles greater than the acceptance angle is zero and at the boundary angles of ±2.5° has very steep, almost perpendicular edges and within this acceptance angle region is frequently saturated by factors of the order of a 1000-fold.

This characteristic of the intensity distribution, however, also leads thereto that it not only has to be aligned very accurately. Moreover, an electronic alignment means, which during the aligned procedure displays the current received signal is practically unusable, as such a display normally shows a zero and on entry into the acceptance angle goes to the full amplitude without a warning, without in this respect giving an indication of how well the alignment angle is centrally arrived at.

From U.S. Pat. No. 5,393,973 a method for the checking of the observance of the acceptance angle is known. In this respect light beams are deliberately arranged squint to one another. The receiving intensities are offset relative to one another by a corresponding error angle. If one now applies the respectively largest received intensity in ratio to the respectively smallest received intensity for the alignment angle then a maximum arises. As long as this ratio remains over a threshold the alignment is acceptable. This common method relies on the squint angle which complicates the alignment process rather than simplifying it, as two light beams offset from one another have to be aligned even more accurately to maintain a required acceptance angle.

In DE 20 2006 012 454 U1 apertures for an electronic alignment aid are used which ensure that around the central transmission light cone a ring of weaker light arises with the required acceptance angle from which an indication on the alignment is derived. The alignment must, however, be subsequently continued until the central transmission light cone is received and the alignment aid only gives little and insufficient assistance.

In DE 101 06 755 A1 a data light barrier having two sensor units is disclosed, wherein the second sensor unit imparts a measured received intensity to the first sensor unit. The first sensor unit shows this as a measure for the quality of the alignment. This measure, however, is only a relative measure which still significantly depends from the unknown separation distance in accordance with DE 101 06 755 A1. I.e. one can recognize with the common system by pivoting in which direction the alignment is improved and in which it is worse. However, it must still be aligned for so long until the desired alignment is achieved and there is no quantitative evidence with regard to the error angle. Moreover, for a data light barrier no requirements have to be satisfied for the bypassed light safety, as it ultimately does not matter whether the optical transmission path is direct or indirect and thus no acceptance angle is predefined.

It is moreover known in the prior art to use a plurality of thresholds instead of a simple switch threshold. The dynamics of the received intensity should thereby be compensated during the continuous operation in a free optical path which arises, for example due to stray light, contaminations or different optical properties of the objects to be detected. In DE 199 14 114 A1, for example beside the switching threshold two further thresholds are defined above the switching threshold. If the received intensity leaves the interval defined by these two thresholds on undisturbed optical paths, then all thresholds are correspondingly readjusted. However, neither the alignment is simplified thereby, nor is the bypassed light safety increased by this.

For this reason it is the object of the invention to simplify the alignment of such types of sensors. In this respect the sensor should remain bypassed light safe.

This object is satisfied by an optoelectronic sensor in accordance with claim 1, as well as a method for the manufacture and mounting of an optoelectronic sensor in accordance with claim 11. In this respect, the invention is based on the basic idea that rather than using saturated signals such signals are to be used whose intensity distribution shows a detectable dependence on the alignment angle. Then from a measured received intensity one can conclude on the actual alignment angle. The acceptance angle is now not forced by the alignment, but electronically set by the two thresholds by means of the measured received intensity. Should the current alignment angle now not be in a region in which an intensity band can be electronically set because of a very large error alignment then an information can be provided to the user by how much the alignment still deviates from an ideal alignment if the current alignment angle still does not fall into a region.

The invention has the advantage that light can be received for a significantly larger alignment angle region and through this the sensor can be mounted in correspondingly more tolerant alignment angles. An exacter alignment is not required as depending on the safety class of the norms, the desired acceptance angle for the bypassed light safety can be maintained by electronic settings. The transmission optics and/or receiving optics are significantly simplified, as exacter apertures for setting a small steep intensity distribution, as are shown in FIG. 6, can be omitted. The light power for the light transmitters must in this respect not be increased, as in accordance with the invention additional light energy is also present in common larger alignment angles, however, this is covered by the apertures. In contrast to this the light transmitters are operated with smaller transmission currents on use of the sensors in ranges than are maximally possible. Through this also infrared radiation in the environment and the influence of other systems is reduced. In turn the light receivers are not in saturation and are thus in a position to recognize interfering radiation from outside.

The upper threshold and the lower threshold provided in accordance with the invention define an intensity band about the measured received intensity. For this initially an angular band is placed about the actual alignment angle as an acceptance angle region which satisfies the predefined requirements of e.g. ±2.5°. An adaptation between intensity and alignment angle then occurs via the intensity distribution. In this respect the sensor knows the complete functional correlation between alignment angle and intensity for the practically relevant angular region and the practically relevant resolution. The intensity distribution is preferably stored as a value table which includes so many values as are required for the requirements on the acceptance angle. Alternatively a calculation rule is stored which generates the function of the intensity distribution. This calculation rule can for example also be based on the transmission current, as long as the correlation between the transmission current and optical output power is sufficiently reliable.

The evaluation unit is preferably be configured to recognize a beam interruption by means of an intensity of the received signal dropping below the lower threshold and bypassed light or stray light from an intensity of the received signal above the upper threshold. A light beam is not considered to be interrupted as long as the intensity of the received signal is within the intensity band between the lower threshold and the upper threshold. A deviation from the intensity band is detected, wherein a certain minimum time can be required to differentiate the events to be detected from temporary interruptions by dust or such like. The received intensity reduces on an object intrusion due to an at least partial shading of the light beam, which is recognized by the lower threshold. However, also too much light means an error, as the actual light beam is not increased in its received intensity without a reason. Possible causes are stray light which can, however, be blanked out by the coding of the transmission beam and, in particular bypassed light, as its light stems from the associated transmitter and for this reason is also correctly coded. On exceeding the upper threshold no object interference has occurred, but the sensor reports an error, so that the bypassed light or other sources of interference are removed.

A respective intensity distribution is preferably stored in the memory for different separation distances between the light transmitter and the light receiver. Alternatively, the evaluation unit is configured to recalculate the intensity distribution for different separating distances. For this reason an intensity distribution for a fixed separation distance is predefined and is transformed due to the quadratic distance law. In a mixed form the separation distance is divided into discrete classes between a minimal range and a maximal range of the sensor and for each separation class an intensity distribution is stored which is then interpolated on the basis of the separation law.

The sensor preferably has an input device for configuration of the separation distance between the light transmitter and the light receiver. As the absolute values of the intensity distribution have to be evaluated and this strongly depends on the separation distance, the separation distance is parameterized by the sensor in this manner. Alternatively, the evaluation unit is configured to measure the separation distance between the light transmitter and the light receiver. This can for example occur via a light propagation time. In a light grid a further possibly arises, to count the number of the receivable light transmitters receivable by a light receiver which increases with the separation distance, in accordance with the possibilities shown in EP 1 544 643 A1. Furthermore, alternatively this sensor is specified for a fixed separation distance and setup in this manner.

Advantageously the acceptance angle range is configurable. Typically for each different acceptance angle has to be exchanged, for example a change of ±2.5° to ±5° the sending and/or receiving optics. In accordance with the invention an electronic setting is sufficient which takes advantage of the dependence of the acceptance angle region on the distance between the lower threshold and the upper threshold.

The sensor preferably has a display which contains information on how much the alignment angle deviates from an ideal alignment. The received intensity measured during the alignment can be directly transformed into an alignment angle with the aid of the intensity distribution which at the same time is the deviation from the ideal alignment at 0° at which the intensity maximum is at the center of the light receiver. This number value in degrees is displayed by the sensor e.g. on an LCD display as a color or a number on a LED or such like. Through the constant increase and decrease of the intensity distribution thus a continuous electronic alignment display can be realized. With the aid of this continuous display the mechanic can very quickly also find the direction in which the alignment is further improved. However, an alignment is not necessary: severe error alignments in which due to the extended angular region no signal can be received as can be recognized with the naked eye and as soon as a signal is received the two thresholds can be electronically determined without a further alignment. An improved alignment, however, increases the performance reserves.

The light transmitter and/or the light receiver preferably has a transmission optics or a receiving optics which ensures that the intensity of the received signal falls off uniformly in dependence on the alignment angle. Thereby a good evaluatable intensity distribution is achieved. The intensity distribution is saturated, in particular for no alignment angles, wherein a saturation in a small interval about 0° is plausible and harmless. The intensity distribution falls off around the ideal alignment at an alignment angle of 0° in both directions, i.e. with the value of the alignment angle decreasing monotonously or even strongly decreasing monotonously. In this respect evaluatable intensities for large angles are achieved then for typical safety technical angles. The intensity distribution therefore falls off to a smaller measurable value which is no longer reliable, for example at angles of ±5° or even only at angles of ±7.5° or more, at angles of ±10° or more, or at angles of ±15° or more.

Apart from an algebraic sign, the intensity distribution is preferably clearly dependent on the alignment angle. As small angular errors practically have no influence, no stringent monotony has to be required, as long as constant partial regions are small. Due to the axial symmetry with regard to the ideal alignment angle this uniqueness is given apart from the algebraic sign. The intensity distribution allows the unique conclusion on the value of the alignment angle by means of the measured intensity. Examples for an intensity distribution which satisfy these requirements are a Gauss curve, a parabola, a triangle and similar functions. The most robust is a linear intensity distribution, i.e. a triangular shape, wherein a type of dent could possibly be provided at the peak, as a mechanic would try to align it on the peak and this can practically not be achieved for a real triangle. Alternatively, it is also plausible to completely omit the transmission optics and to use the natural beam profile of the light source or the natural beam profile of its internal optics. In this respect an approximately Gaussian intensity distribution also arises and which at least monotonously falls off at its both sides.

The evaluation unit is preferably configured to check the optical output power of the light transmitter. For this reason the transmission currents can initially be examined. Common light sources generate a desired optical output power, however, frequently not reliable for a predetermined transmission current, as these are merely specified to a minimum output power which can be out performed by double or more than the minimum output power. For this reason a further receiver is preferably provided beside the light transmitter, to measure the actual light power. In a light grid in which the light transmitters and the light receivers are mixed in a strip, one of the present neighboring light receivers, which are in anyway present, can take over this task with an optical bypass without any problem. A further possibility is provided in that the opposing receiver of the other strip measures the light power and passes this information back to the first strip, in an optically coded manner, as is the case for a data light barrier. If deviations from the optical output power are determined with respect to the original light power then this leads to an error.

In a maintenance mode, in which it is ensured that the light beams are free, the light power can also be readjusted to restore the originally saved output power and, for example to thus compensate a creeping contamination. In this respect the alignment has to be maintained, as the sensor can otherwise not differentiate between alignment errors and losses of the optical output power.

The sensor is preferably configured in a light grid with a plurality of optoelectronic sensors with only one light beam, wherein the individual light beams are arranged parallel to one another. The individual light beams are also referred to as channels. In a light grid all components do not necessarily have to be multiplied, but for example housings, connections and evaluating unit can be commonly used. Also the intensity distributions, as long as the internal displacement of the light beams remains small, can be the same with regard to one another and do not have to be saved a plurality of times.

Even more preferably a switch off signal can be transmitted via a secure output of the light grid when a received signal falls below the lower threshold or exceeds the upper threshold. The sensor is then a secure light grid which can be used as a touch-free acting safety device in a safety technology application which spans a secure field for the protection of a source of danger. The cut-off signal places a machine, which forms the source of danger, into a safety-related stop.

The evaluation unit is preferably configured to obtain an information on the alignment of the light transmitters with respect to the light receivers from a comparison of the intensities of a plurality of light beams. In an ideally aligned light grid, the maximum of the intensity distribution of all channels lies centrally on the light receiver. By means of correlation of the individual channels the evaluation unit calculates information on which axis the alignment is not correct, i.e. whether a strip is rotated about its main axis, or is tipped forward or tipped to the side and also to what degree the angle is incorrect. The algebraic sign of the alignment angle can only be provided from a plurality of measurements under the assumption of the consistency of the alignment movement due to the actual symmetry of the intensity distribution. Alternatively, it is plausible to use specific asymmetric intensity distributions, for example by means of an asymmetric aperture and to determine the algebraic sign also in this manner.

In a very similar method during the operation and following the completion of the mounting and thus for a fixed alignment the plausibility of the measured intensities is checked. The alignment and thus the individual expected intensities in the channels are then known and a correlation can determined significant differences to improve the reliability of individual evaluations.

The method in accordance with the invention can be furthered in a similar manner and in this respect has similar advantages. Such advantageous features are exemplary, but not conclusively described in the dependent claims dependent on the independent claims.

In particular the optical output powers of the light transmitter are preferably measured and transmission currents for the light transmitters are set such that they correspond to desired output power. Thus, for example in a final check, tolerances of the light transmitters are compensated whose specifications are frequently not ensured in that, for example, for an equal transmission current the same optical output powers are also delivered. It is important for the invention that the output power is known, as otherwise the association between the alignment angle and intensity for a predefined separation distance and correspondingly for the threshold setting for the acceptance angular region is not correct. As typically during the final finishing the exit angle and the minimum intensity are already checked this requires a very small and completely automatized additional demand to use the anyway present measurement results for the intensity and to also use these to set the transmission currents.

In a preferred embodiment the deviations from the parallel alignment of the light transmitters to one another are measured and stored. It is intended that the optical axes of the light transmitters are completely parallel to one another. The remaining tolerances can be saved by teaching the actual intensity distribution in the final finishing and compensate this later on during operation. In this respect one assumes, for example that the actual intensity distribution is identical in all channels and only saves an offset in the alignment angle. Alternatively, all intensity distributions are taught and thus also form different beam characteristic of the light transmitters are stored.

Figure 2:
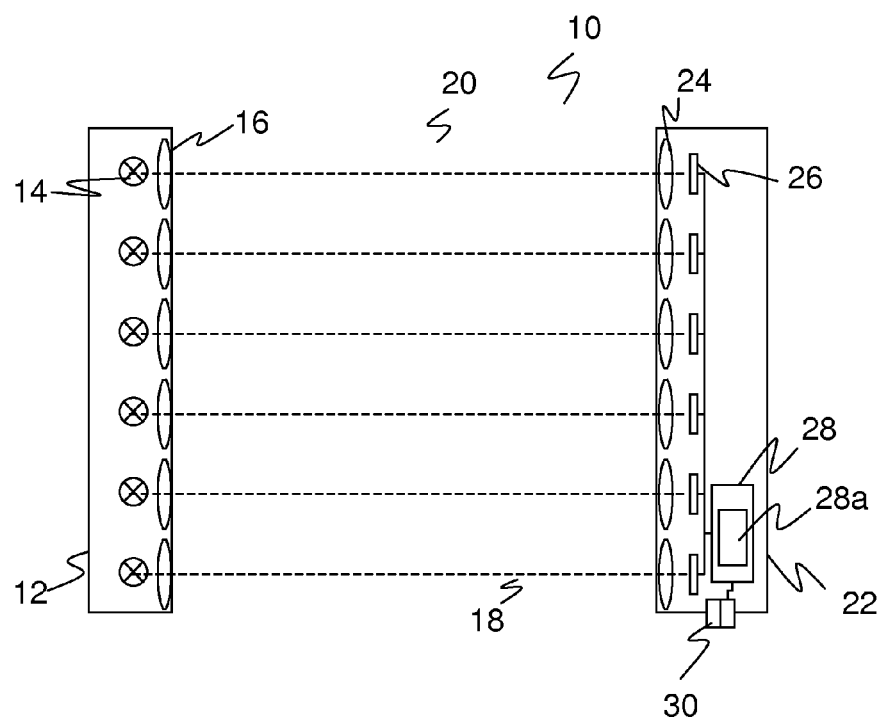
Figure 3:
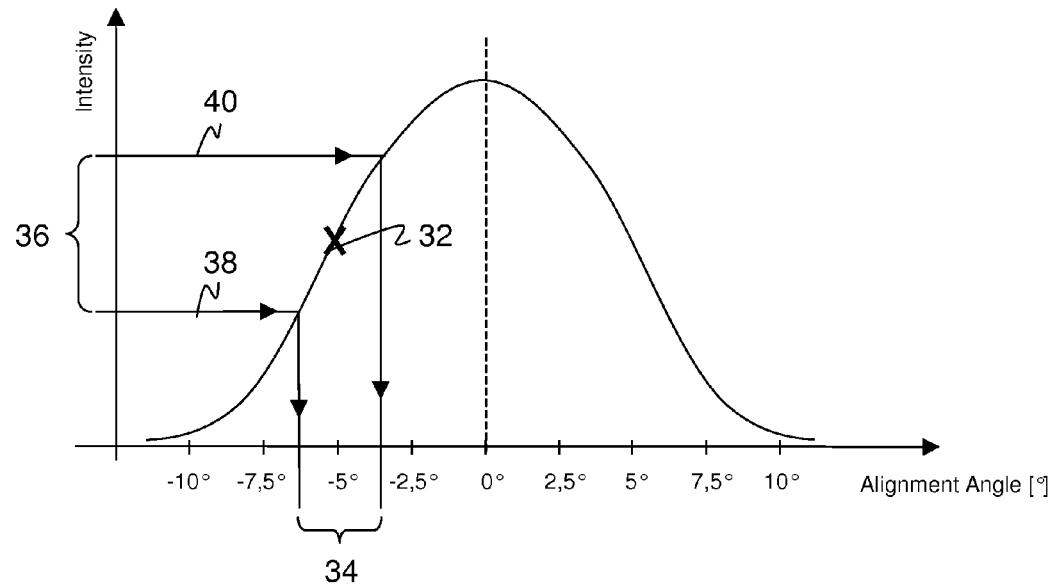
Figure 4:
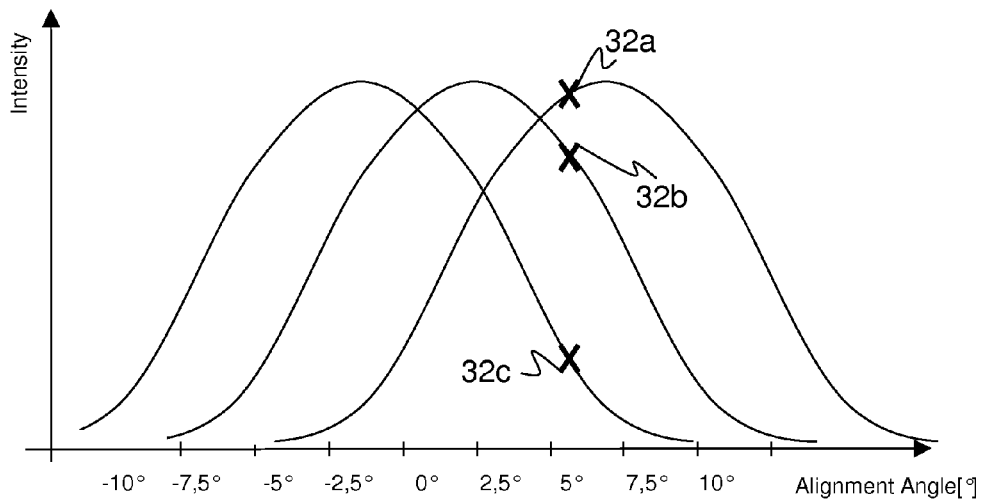
Figure 5A:
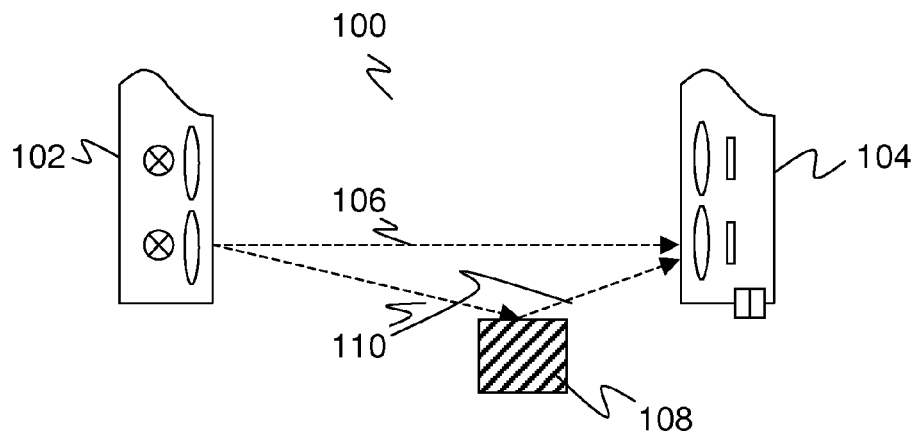
Figure 5B:
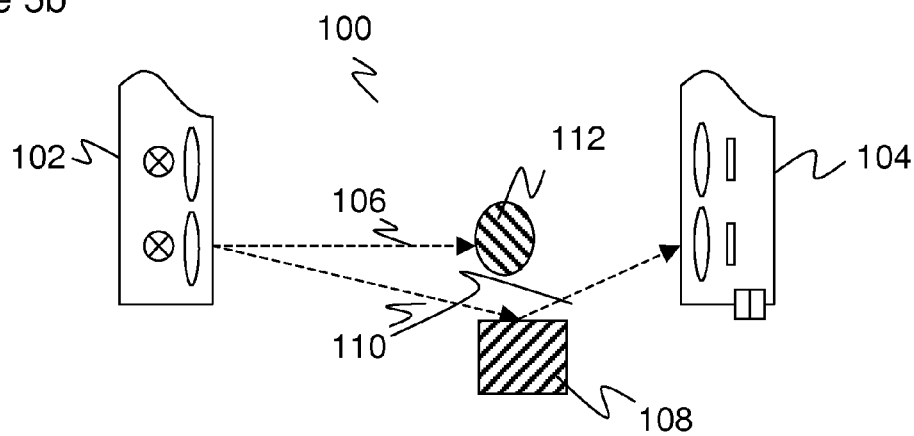
Figure 5C:
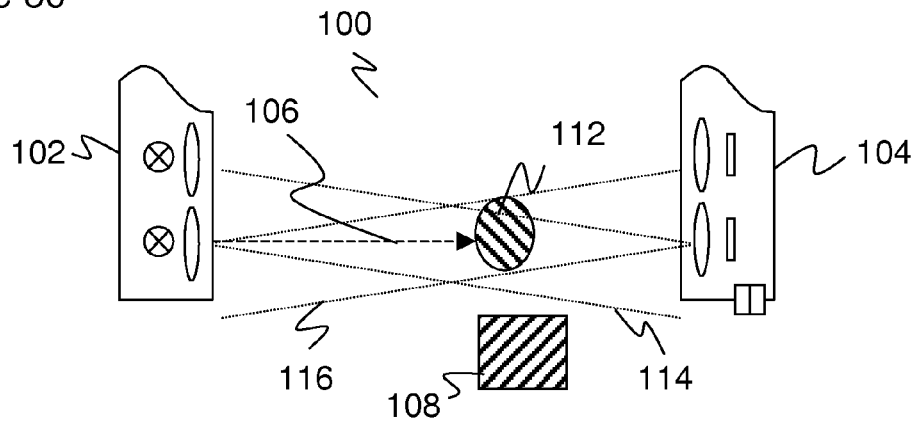

The invention will be described in detail in the following also in view of further features and advantages with reference to embodiments with the aid of the submitted drawings. The images of the Figures show in:

FIG. 1 a schematic sectional illustration of a light barrier;

FIG. 2 a schematic sectional illustration of a light grid;

FIG. 3 an illustration of the intensity distribution in dependence on the alignment angle for the explanation of the threshold determination in accordance with the invention;

FIG. 4 an illustration of a plurality of intensity distributions in dependence on the alignment angle in different channels of the light grid;

FIG. 5*a-c* sections of simplified sectional illustrations of the light grid for the explanation of bypassed light and acceptance angles; and FIG. 6 an illustration of the intensity distribution in dependence on the alignment angle in accordance with the prior art.

In an overview, the elements of an optoelectronic sensor 10 in accordance with the invention will be described in two exemplary embodiments as a light barrier respectively a light grid with reference to FIGS. 1 and 2. With reference to FIGS. 3 and 4 then the evaluation method and the alignment of the sensor 10 is described in detail.

FIG. 1 shows a schematic sectional illustration of the light barrier 10. A transmission part 12 includes a light transmitter 14, for example an LED or a laser in the infrared spectrum or a different spectrum. The light of the light transmitter 14 is collimated by a transmission optics 16 arranged downstream thereof and sent as a light beam 18 through a monitoring zone 20 to a receiving part 22. The light beam 18 is incident on a light receiver 26 via a receiving optics 24 which is typically formed as a photodiode, however alternatively can also be a position sensitive CCD or a CMOS image sensor.

The transmission optics 16 and also the receiving optics 24 can include further elements such as additional lenses, apertures and such like in contrast to the illustration and ensure that the light beam 18 has a desired beam profile and consequently a predefined intensity distribution in dependence on an alignment angle at which the transmission part 12 and the receiving part 22 are aligned with respect to one another. In an alternative embodiment the intensity distribution is already achieved without specific optics by means of the natural radiation or the internal setup of the light transmitter 14.

An evaluation unit 28 is connected to the light receiver 26 and thereby receives an electrical received signal which corresponds to the intensity of the received light. With the aid of two thresholds which are derived from an intensity distribution which is stored in a memory 28*a*, the evaluation unit 28 checks whether the received intensity of the light beam 18 remains within an intensity band. If this is not the case then the light beam 18 is interrupted and/or bypassed light or an interference by means of stray light is present. The corresponding signal is emitted via an output 30 in the sensor 10.

As a further embodiment FIG. 2 shows an optoelectronic sensor in accordance with the invention in a schematic sectional illustration of a light grid 10. Here and in the following the same reference numerals are used for the same features or features which correspond to one another. The transmission part 12 is formed as a transmission strip having a plurality of light transmitters 14 arranged in a series with whom a respective light receiver 26 is associated in a receiving part formed as a receiving strip. In contrast to the illustration the light transmitter 14 and the light receiver 26 can also be mixed on the two strips 12, 22.

For safety technical applications, the light grid 10 is configured corresponding to the initially mentioned norms. If the evaluation unit 28 recognizes an interference in the protective field 20 spanned by the light beams 18 while at least one light beam 18 is interrupted and for this reason the received intensity in the associated light receiver 26 drops below a lower threshold then a safety-related shut-down command is emitted via the secure output 30 (OSSD, Output Signal Switching Device). A shut-off command also occurs then when the evaluation unit 28 recognizes an error. A particular error is the presence of bypassed light which is recognized on exceeding an upper threshold.

FIG. 3 shows an exemplary intensity distribution in dependence on the alignment angle. The transmission part 12 and the receiving part 22 are ideally aligned with respect to one another when the intensity maximum lies at 0° centrally on the light receiver 26. The shown intensity distribution and the absolute amplitude value are only valid for a certain separation distance between the transmission part 12 and the receiving part 22 and are known in the evaluation unit 28. For this initially the separation distance is measured or input. The evaluation unit 28 then calculates the intensity distribution for the actual separation distance or can access the memory 28*a* in which the intensity distribution corresponding to the separation distance is stored.

During the mounting of the sensor 10 the transmission part 12 and the receiving part 22 are only aligned in a coarse manner according to the naked eye. Then the received intensity 32 is measured and with the aid of intensity distribution is recalculated into an alignment angle. The evaluation unit 28 places an acceptance angle region 34 which, for example, corresponds to one of the highest possible angular regions required by the norm around this alignment angle. The acceptance angle region 34 in turn is classified by the evaluation unit 28 by means of the intensity distribution as an intensity band 36 having a lower threshold 38 and an upper threshold 40. The evaluation unit 28 does not have the possibility to determine from a single measurement whether it is located on a raising edge or a falling edge of the intensity distribution. However, this does not make a practical difference as the same thresholds 38, 40 would be determined on the falling edge.

The intensity distribution, as was previously described, should drop-off at both sides monotonously, if possible even linearly, so that the threshold separation distance becomes independent of the alignment. Flat partial regions in the intensity distribution lead to very closely lying or even overlapping thresholds 38, 40 and for this reason should only extend at least only for fractional parts of the required acceptance angle region 34.

During operation the evaluation unit 28 monitors whether the received signal remains between the lower threshold 38 and the upper threshold 40. A sinking below the lower threshold 38 is interpreted as an interruption of the light beam 18 and thus interpreted as an object recognition. An exceeding of the upper threshold 40 is interpreted as bypassed light. Both lead to a corresponding signal at the output 30, in the case of a safety-technical application it also leads to a safety-related shut-down command.

So that the thresholds are error-safe during operation it has to be tested regularly whether an intensity distribution stored in the evaluation 28 still corresponds to the actual received intensity for an undisturbed light beam 18. For this reason the optical output power of the light transmitter 14 has to be monitored.

In accordance with the invention it is not necessarily required to improve the first coarse alignment, as the electronic setting of the thresholds 38, 40 ensures the maintenance of the acceptance angle. For a larger functional reserve it is, however, advantageous to come close to the ideal case having an alignment angle of 0°. For this reason in a further embodiment a display of the sensor 10 is provided which continuously shows the actual alignment angle which is derived from the received intensity 32. Through this the alignment can be specifically and quickly improved. The process can be interrupted at any point in time and the evaluation unit determines the two thresholds 38, 40 with the achieved alignment as is described above.

FIG. 4 shows a plurality of intensity distributions for a plurality of channels of a light grid 10 in dependence on the acceptance angle. For ideally aligned light grids without error tolerances in the internal alignment, the light transmitter 14 the intensity distributions would lie exactly above one another. From the mutual displacements, i.e. the different intensity values 32*a-c* for an exemplary alignment angle currently assumed, the evaluation unit 28 can derive and provide a statement on the position of the transmission strip 12 and the receiving strip 22 by a comparison and state which alignment angle is present in which rotation axis with respect to an ideal alignment. Again this information does not have an algebraic sign because of the symmetric intensity distribution therefore it cannot indicate a direction on the basis of a single measurement. Through a continuous evaluation or display, however, the direction can be determined.

A certain portion of the offset of the intensity distributions in FIG. 4 is possibly not related to the alignment, but to the manufacturing tolerances of the parallel alignment of the light beams 18 associated with one another. For this reason in an embodiment of the invention it is provided that in the final check of the manufacturing the light grid 10 is taught how the intensity distribution for each light transmitter 14 and light receiver 26 lies with respect to a common axis. The thereby determined offset of each light beam 18 can be compensated during operation there, so that from the correlation the measurement values of the different optical channels can actually infer the position and rotation of the light grid 18 rather than the manufacturing tolerances.

The invention claimed is:

1. An optoelectronic sensor (10), in particular a light barrier having a light transmitter (14) for the transmission of a light beam (18) and a light receiver (26) arranged facing the light transmitter (14) at an alignment angle to transform the received light beam (18) into an electrical received signal, wherein the transmission power of the light transmitter (14) and/or the reception sensitivity of the light receiver (26) is/are set, such that the received signal has an intensity distribution varying in accordance with the alignment angle and wherein an evaluation unit (28) of the sensor (10) is configured to determine by means of the received signal whether the light beam (18) is interrupted or not, wherein the intensity distribution is stored in a memory (28*a*) of the sensor (10) and wherein the evaluation unit (28) is configured to determine, with reference to the measured intensity of the received signal from a measured intensity distribution, a lower threshold (38) and an upper threshold (40) whose separation corresponds to an accepted angular range.

2. A sensor (10) in accordance with claim 1 wherein the evaluation unit (28) is configured to detect a beam interruption from an intensity of the received signal below the lower threshold (38) and to detect bypass light or stray light from an intensity of the received signal above the upper threshold (40).

3. A sensor (10) in accordance with claim 1 wherein respective intensity distributions are stored in the memory (28*a*) for different separation distances between the light transmitter (14) and the light receiver (26), or wherein the evaluation unit (28) is configured to adapt the intensity distribution for different separation distances by calculation.

4. A sensor (10) in accordance with claim 1 which has an input device for configuration of the separation distance between the light transmitter (14) and the light receiver (26), or wherein the evaluation unit (28) is configured to measure the separation distance between the light transmitter (14) and the light receiver (26).

5. A sensor (10) in accordance with claim 1 wherein an acceptance angle range is configurable.

6. A sensor (10) in accordance with claim 1 which has a display which contains information on how much the alignment angle deviates from an ideal alignment.

7. A sensor (10) in accordance with claim 1 wherein the light transmitter (14) has a transmission optics (16) and/or the light receiver (26) has a receiving optics (24) which ensures that the intensity of the received signal falls off uniformly in dependence on the alignment angle.

8. A sensor (10) in accordance with claim 1 wherein the evaluation unit (28) is configured to check the optical output power of the light transmitter (14).

9. A light grid having a plurality of optoelectronic sensors (10) each having a light transmitter (14) for the transmission of a light beam (18) and a light receiver (26) arranged facing the light transmitter (14) at an alignment angle to transform the received light beam (18) into an electrical received signal, wherein the transmission power of the light transmitter (14) and/or the reception sensitivity of the light receiver (26) is/are set, such that the received signal has an intensity distribution varying in accordance with the alignment angle and wherein an evaluation unit (28) of the sensor (10) is configured to determine by means of the received signal whether the light beam (18) is interrupted or not, wherein the intensity distribution is stored in a memory (28*a*) of the sensor (10) and wherein the evaluation unit (28) is configured to determine, with reference to the measured intensity of the received signal from a measured intensity distribution, a lower threshold (38) and an upper threshold (40) whose separation corresponds to an accepted angular range, wherein the light beams (18) of the optoelectronic sensors (10) are arranged parallel to one another wherein, in particular a shut off signal can be emitted via a secure output (30) of the light grid when one of the received signals falls below the lower threshold (38) or exceeds the upper threshold (40).

10. A light grid in accordance with claim 9 wherein the evaluation unit (28) is configured to obtain an information on the alignment of the light transmitters (14) with respect to the light receivers (26) from a comparison of the intensities of a plurality of light beams (18) or, for fixed alignment, to check the plausibility of the measured intensity.

11. A method for the manufacture and mounting of an optoelectronic sensor (10), in particular a light barrier or a light grid, wherein one or more light transmitters (14) for transmitting a respective light beam (18) are arranged facing one or more light receivers (26) at an alignment angle to transform received light beams (18) into an electronic received signal and the light receivers (26) are connected to an evaluation unit (28) for determining whether a light beam (18) is interrupted or not, wherein the transmission power of the light transmitters (14) and/or the receiving sensitivity of the light receivers (26) are set such that the received signal has an intensity distribution which varies according to the alignment angle, wherein the intensity distribution is stored in a memory (28a) of the sensor (10) and the evaluation unit (28) determines, with reference to a measured intensity of the received signal from the measured intensity distribution, a lower threshold (38) and an upper threshold (40) whose separation corresponds to an accepted angular range.

12. A method in accordance with claim 11 wherein the separation distance between light transmitters (14) and light receivers (26) is input or measured and an intensity distribution associated with the separation distance is calculated or read out from the memory (28a) and used for the further operation.

13. A method in accordance with claim 11 wherein the accepted angular range is configured.

14. A method in accordance with claim 11 wherein the optical output powers of the light transmitters (14) are measured and transmission currents are set for the light transmitters (14), such that they correspond to a desired output power.

15. A method in accordance with claim 11 wherein deviations from the parallel alignment of the light transmitters (14) amongst one another are measured and saved.

* * * * *